(12) United States Patent
Langston et al.

(10) Patent No.: US 7,194,088 B2
(45) Date of Patent: Mar. 20, 2007

(54) METHOD AND SYSTEM FOR A FULL-ADDER POST PROCESSOR FOR MODULO ARITHMETIC

(75) Inventors: R. Vaughn Langston, Glendale, AZ (US); Richard J. Takahashi, Phoenix, AZ (US); Gregg D. Lahti, Gilbert, AZ (US)

(73) Assignee: Corrent Corporation, Tempe, AZ (US)

( * ) Notice: Subject to any disclaimer, the term of this patent is extended or adjusted under 35 U.S.C. 154(b) by 469 days.

(21) Appl. No.: 09/970,901

(22) Filed: Oct. 4, 2001

(65) Prior Publication Data

US 2003/0031316 A1    Feb. 13, 2003

Related U.S. Application Data

(60) Provisional application No. 60/296,956, filed on Jun. 8, 2001.

(51) Int. Cl.
*H04K 1/00* (2006.01)
*G06F 7/38* (2006.01)
*G06F 7/00* (2006.01)

(52) U.S. Cl. .................. 380/28; 708/491; 708/492
(58) Field of Classification Search ............... 713/200; 380/28

See application file for complete search history.

(56) References Cited

U.S. PATENT DOCUMENTS

| | | | | |
|---|---|---|---|---|
| 4,949,301 A | * | 8/1990 | Joshi et al. | 711/100 |
| 5,187,783 A | * | 2/1993 | Mansfield et al. | 710/23 |
| 5,289,397 A | * | 2/1994 | Clark et al. | 708/491 |
| 5,349,551 A | * | 9/1994 | Petro | 708/491 |
| 5,479,365 A | * | 12/1995 | Ogura | 708/491 |
| 5,572,454 A | * | 11/1996 | Lee et al. | 708/492 |
| 5,724,279 A | * | 3/1998 | Benaloh et al. | 708/491 |
| 5,828,590 A | * | 10/1998 | Chen et al. | 708/628 |
| 6,085,210 A | * | 7/2000 | Buer | 708/491 |
| 6,141,422 A | * | 10/2000 | Rimpo et al. | 380/44 |
| 6,151,393 A | * | 11/2000 | Jeong | 380/265 |
| 6,182,104 B1 | * | 1/2001 | Foster et al. | 708/501 |
| 6,209,016 B1 | * | 3/2001 | Hobson et al. | 708/491 |

(Continued)

OTHER PUBLICATIONS

Grossschaedl J: "A Bit-Serial Unified Multiplier Architecture for Finite Fields GF (P) and GF (2M)" Cryptographic Hardware and Embedded Systems. 3rd International Workshop, Ches 2001, Paris France, May 14-16, 2001 Proceedings; Lecture Notes in Computer Science, Berlin: Springer, De, vol. 2162, May 14, 2001, pp. 202-219.

(Continued)

*Primary Examiner*—Christopher Revak
*Assistant Examiner*—Eleni Shiferaw
(74) *Attorney, Agent, or Firm*—Ingrassia Fisher & Lorenz

(57) ABSTRACT

A full-adder post processor performs modulo arithmetic. The full-adder post processor is a hardware implementation able to calculate A mod N, (A+B) mod N and (A−B) mod N. The processor includes a full adder able to add the operands A and B while modulo reduction is accomplished in the processor by successively subtracting the largest possible multiple of the modulus N obtainable by bit shifting prior to subtraction.

22 Claims, 12 Drawing Sheets

U.S. PATENT DOCUMENTS

| | | | |
|---|---|---|---|
| 6,748,410 B1* | 6/2004 | Gressel et al. | 708/491 |
| 6,772,300 B1* | 8/2004 | Manseau | 711/154 |
| 2001/0010077 A1* | 7/2001 | McGregor et al. | 713/174 |
| 2002/0010730 A1* | 1/2002 | Blaker | 708/491 |
| 2002/0039418 A1* | 4/2002 | Dror et al. | 380/28 |
| 2002/0186837 A1* | 12/2002 | Hopkins et al. | 380/28 |
| 2005/0185791 A1* | 8/2005 | Chen et al. | 380/30 |

OTHER PUBLICATIONS

Koc, Cetin Kaya, *High-Speed RSA Implementation*, RSA Laboratories, Version 2.0, Nov. 1994, 70 Pages.

U.S. Non-Provisional Application titled Circuit and Method for Performing Multiple Modulo Mathematic Operations by Takahashi et al., filed concurrently herewith.

* cited by examiner

METHOD AND SYSTEM FOR A FULL-ADDER POST PROCESSOR FOR MODULO ARITHMETIC

RELATED APPLICATION

This application is a non-provisional application claiming benefit under 35 U.S.C. sec. 119(e) of U.S. Provisional Application Ser. No. 60/296,956, filed Jun. 8, 2001 (titled METHOD AND SYSTEM FOR A FULL-ADDER POST PROCESSOR FOR MODULO ARITHMETIC by Langston et al.), which is incorporated by reference herein.

BACKGROUND OF THE INVENTION

The present invention relates in general to high-speed cryptographic processing systems and, more specifically, to a method and system for performing modulo arithmetic using a full-adder post processor implemented, for example, in a security coprocessor integrated circuit coupled to a host or network processor.

Modular arithmetic is a type of mathematics that has application in cryptography. In modular arithmetic, the operation A mod N is equal to the residual, or remainder, of A divided by N, such that the residual is between 0 and N-1. Thus, as an example, 16 mod 5 is equivalent to (3×5)+1, so the residual is 1. The foregoing operation is known as modular or modulo reduction.

Modular arithmetic has similarities to regular arithmetic. For example, there is modular addition:

(7+4) mod 5=11 mod 5=1=1 mod 5

There is also modular multiplication:

(7×6) mod 5=42 mod 5=2=2 mod 5

Other mathematical functions such as modular subtraction, (A−B) mod N and modular exponentiation, $A^B$ mod N can be defined.

Modular arithmetic has important uses in the field of cryptography. As the increased use of the Internet and fiber-optic based networks increases the communications flow of confidential information, the need to secure such communications increases. One popular encryption and decryption scheme is the Rivest-Shamir-Adleman (RSA) algorithm, which is used in public key cryptography systems and requires the use of modular arithmetic.

One drawback to the RSA algorithm and other encryption algorithms is that the processing time needed to encrypt or decrypt a message is significant, especially when the algorithms are used with larger keys. Thus, significant demands are placed on a host system's central processing unit. For example, the capacity of a web server handling thousands of on-line secured commercial transactions using a public key approach may be limited by the server's ability to perform modular arithmetic. One way to increase the speed of such algorithms would be to increase the speed of the modular arithmetic used in the algorithm, such as modular exponentiation, through hardware acceleration. Such hardware would desirably include a security coprocessor, coupled to a host or network processor, for handling modular arithmetic.

The modular exponentiation mathematics of the RSA algorithm can be more efficiently computed in a hardware multiplier using the known Montgomery's method for modular reduction. Montgomery's method implements the modular exponentiation ($A^E$ mod N) required in the RSA algorithm by using modular multiplication (AB mod N). When doing modular multiplication in Montgomery's method, it is necessary to perform the modulo reduction A mod N and the modulo addition (A+B) mod N, where the modulus N has a typical length of 512 or 1,024 bits. Also, prior to performing Montgomery multiplication, it is necessary to calculate the value of $Ar^{2(n+8)}$ mod N (where r>N and n is the size in bits of the value N).

Prior modular cryptographic systems typically use a 32-by-32 bit multiplier followed by division using the well-known restoring division or non-restoring division algorithms to compute a final result. However, computation using a 32-by-32 bit multiplier can require millions of clock cycles when handling larger RSA keys (e.g., 1,024-bit keys). It would be desirable to have an improved modular cryptographic system that can handle larger key sizes at high speeds.

In light of the foregoing, it would be advantageous to have an improved modular exponentiation and multiplication system that achieves high performance, low cost, and low power for implementation in an integrated circuit. Thus, there is a need for an improved post processor that does high-speed modulo reduction and addition in such a system. There is a further need for such a processor that can be provided as a high-performance security coprocessor for use with host or network processors.

BRIEF DESCRIPTION OF THE DRAWINGS

For a more complete understanding of the present invention, reference is now made to the following figures, wherein like reference numbers refer to similar items throughout the figures.

DETAILED DESCRIPTION OF THE DRAWINGS

Figure 1:
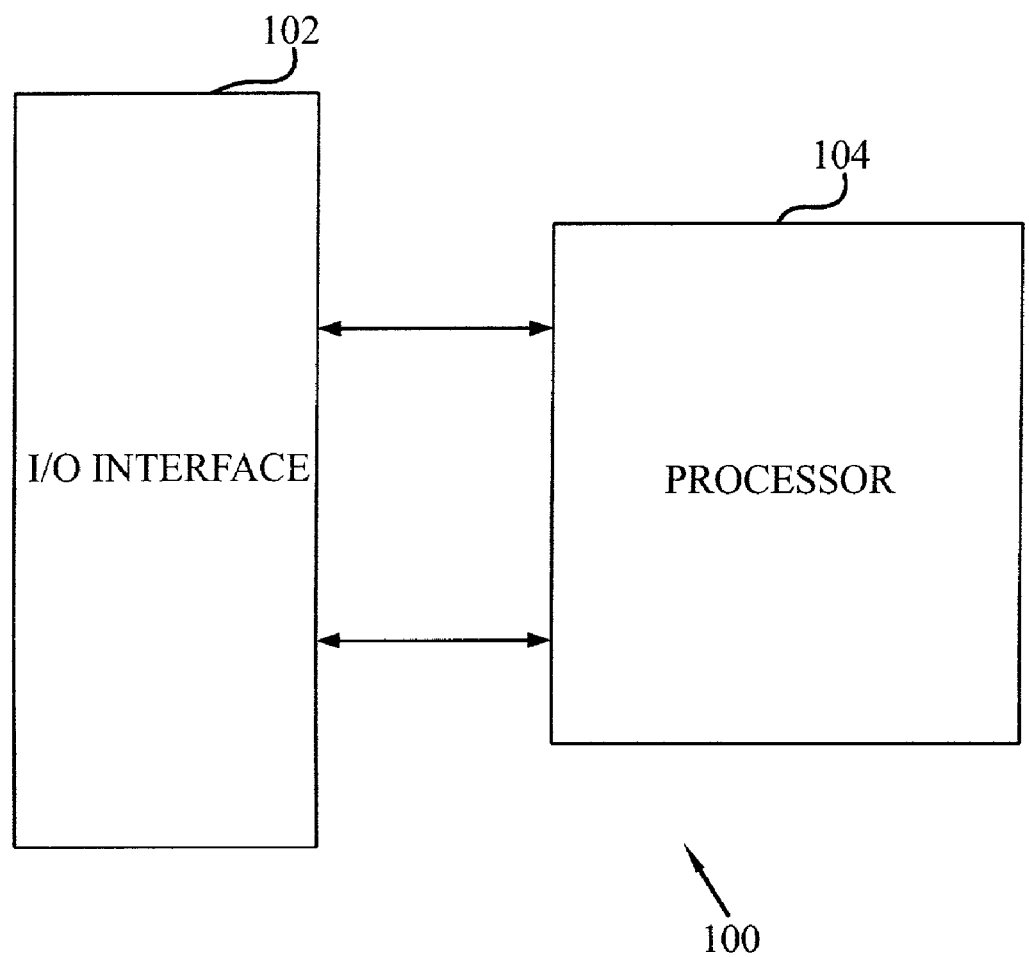
FIG. 1 is a block diagram of a modulo mathematics system.

FIG. 1 illustrates a block diagram of a modulo mathematical processing system 100. System 100 includes an input/output interface 102 coupled to a full-adder post processor 104. Input/output interface 102 is any interface capable of sending numerical data to full-adder post processor 104 and receiving the results. Typically, two numbers need to be sent to full-adder post processor 104. Those are the "A" value and the "N" value when computing A mod N. In one embodiment, "A" may be in carry save adder form consisting of a carry word and a save word. In this case, full-adder post processor 104 needs to add the carry word and the save word to get the sum, which will be the A value in binary form. The modular reduction A mod N can now be calculated. Full-adder post processor 104 is a circuit operable to receive the "A" value and the "N" value and compute A mod N. Since full-adder post processor 104 also includes a full adder, it is also operable to compute A+B, as well as (A+B) mod N by first calculating A+B using the full adder and then calculating that result mod N. Full-adder post processor 104 outputs the results to input/output interface 102.

Figure 2:
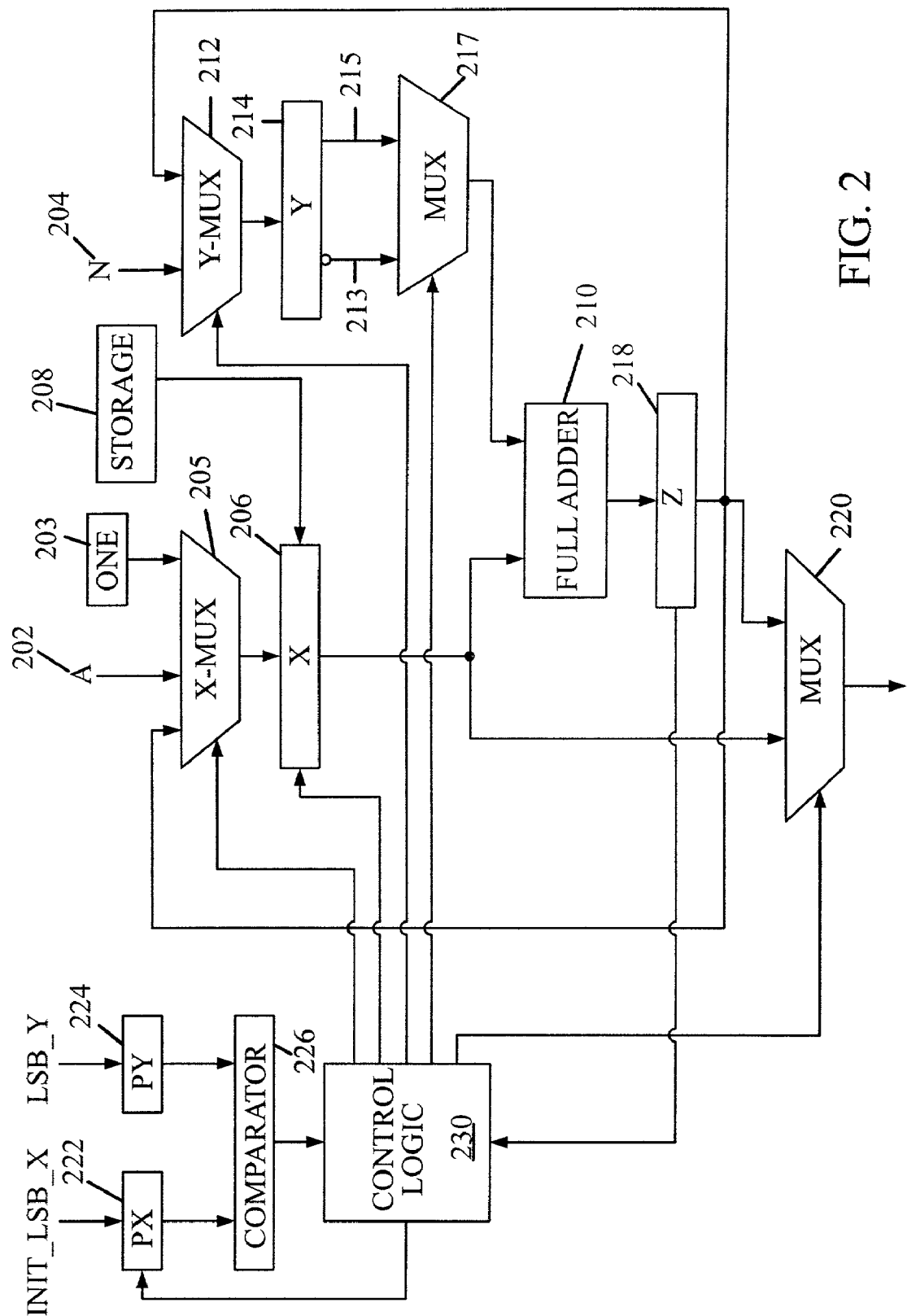
FIG. 2 is a block diagram of a full-adder post processor in accordance with the teachings of the present invention.

FIG. 2 illustrates a block diagram of an exemplary full-adder post processor 104 in accordance with the teachings of the present invention. Included is a first input 202 for a first value and a second input 204 for a second value. First input 202 is coupled to an "X" multiplexer ("mux") 205, which has three inputs and an output. "X" mux 205 outputs to "X" register 206, which has a single output and which is also coupled to an external storage source 208 for storing bits of "A" that do not fit into "X" register 206. These bits are shifted back into "X" register 206 as needed. "X" register 206 outputs to full-adder 210 or to output mux 220. As used herein, the term "register" also is intended to include other types of storage devices that can provide the function of a register as disclosed for the embodiments herein.

Second input 204 provides an input to a "Y" mux 212, which has two inputs and a single output. "Y" mux 212 outputs to "Y" register 214. "Y" register 214 has two outputs: true output 215, which will send the value in "Y" register 214 to a complement/true mux 217 and inverted output 213, which will send the "Y" value with all the bit values inverted to complement/true mux 217. Complement/true mux 217 also outputs to full adder 210 where the contents of "X" register 206 can be added to the contents of "Y" register 214, which will produce a result stored in "Z" register 218.

Also included in full-adder post processor 104 is a "PX" pointer register 222, which monitors the position of the least significant bit of the "X" register 206, and a "PY" pointer register 224, which indicates the least significant bit that has a one in it for "Y" register 214. These registers are compared using comparator 226 and that comparison helps determine when the process is complete. Also included is control logic 230, which helps to control the actions of "X" mux 205, "Y" mux 212, output mux 220, "X" register 206 and complement/true mux 217 and which also increments "PX" register 222. Input INIT_LSB_X to "PX" register 222 corresponds to the initial value of PX, and input LSB_Y to "PY" register 224 corresponds to the constant value of PY. Inputs INIT_LSB_X and LSB_Y are calculated and loaded, as discussed below, (e.g., by system or application software, firmware or hardware) when X register 206 and Y register 214 are loaded. "X" register 206, "Y" register 214 and "Z" register 218 are all designed to be n+2 bits wide where n is the bit length of "N" or the modulus of A mod N. The left-most two bits of "X" register 206, "Y" register 214 and "Z" register 218 are a sign bit (the n+1 bit) and a carry overflow bit (the n bit). Thus, the most significant bit of "X" register 206, "Y" register 214 and "Z" register 218 is the n minus one bit (n−1) of the register and the least significant bit is the 0 bit of the register. In cases where the operand "A" has a longer bit length than the modulus "N", additional bits of operand "A" will be stored in secondary storage 208 and will be shifted into "X" register 206 as needed during calculations. More information on how additional bits are shifted into "X" register 206 is covered in conjunction with FIG. 3. "X" mux 205 additionally has a one input 203, which inputs a binary one into "X" mux 205 for adding to the inverted "Y" value in complement/true mux 217 in order to do a complete two's complement of the original contents of "Y" register 214.

Figure 3:
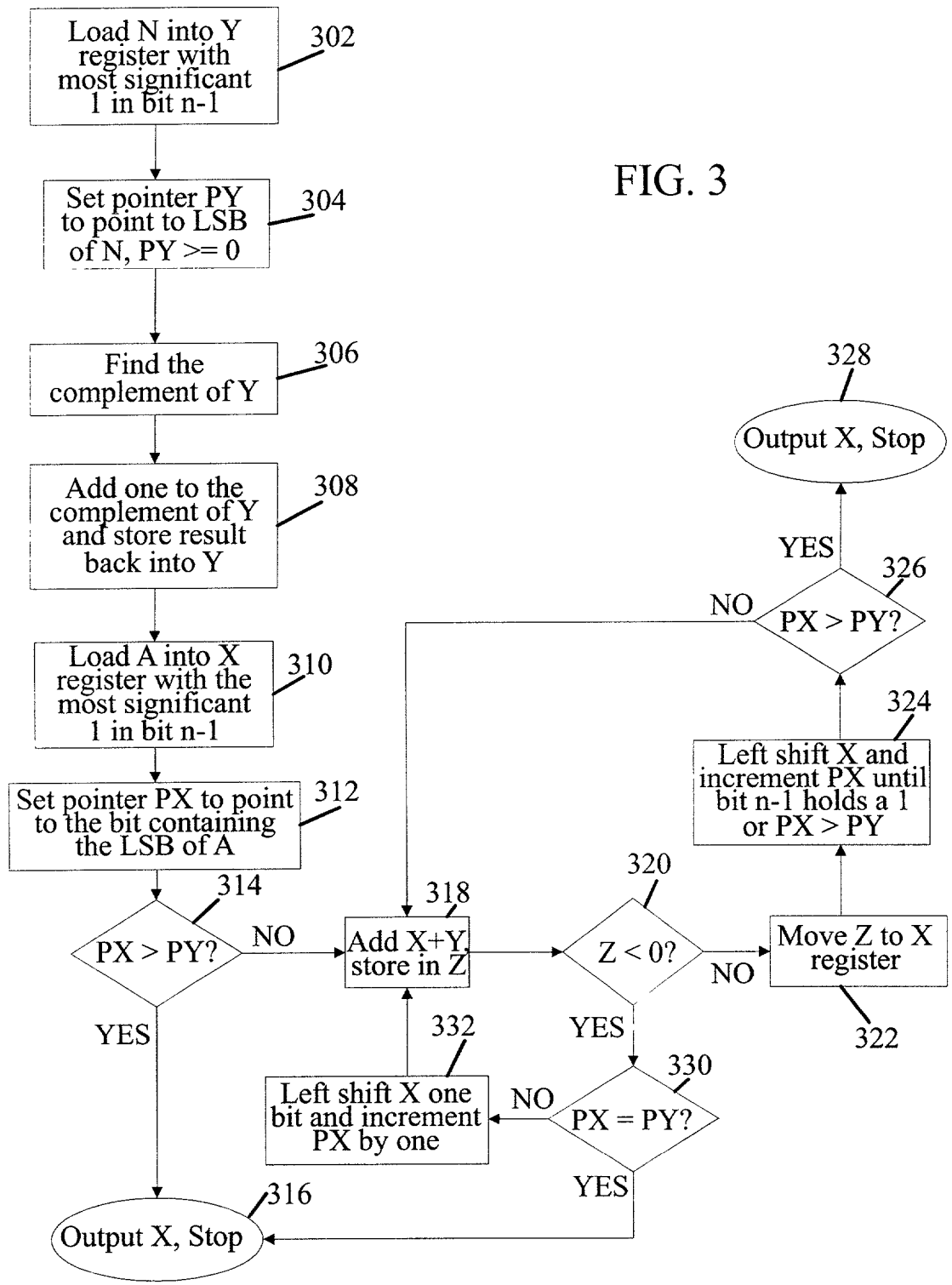
FIG. 3 is a flow chart illustrating a method in accordance with the teachings of the present invention for calculating a modulo reduction using the full-adder post processor of FIG. 2.

FIG. 3 is a flow chart illustrating a method of using full-adder post processor 104 in accordance with the teachings of the present invention. This method illustrates the modulo reduction A mod N. In a first block 302, "N" is loaded into "Y" register 214 through "Y" mux 212 with the most significant one of "N" located in bit n−1 of "Y" register 214. At the same time, in block 304, the pointer in "PY" register 224 is set to point to the bit containing the least significant bit of "N". The pointer in "PY" register 224 will always be greater than or equal to zero, since "Y" register 214 is by design able to accept the entire "N" value.

In block 306, complement/true mux 217, under control of controller 230, receives the complement of "Y" register 214. That is, for each bit stored in "Y" register 214 that held a one, there is a "0" in complement/true mux 217. For each bit stored in "Y" register 214 that held a "0", there is a "1" in complement/true mux 217, and each "0" location now holds a one.

In block 308, a 1 is sent through "X" mux 205 to "X" register 206 where it occupies the least significant bit in "X" register 206. Full-adder 210 will add the 1 to the output of complement/true mux 217. That result will be placed into "Z" register 218 and then be put back into "Y" register 214, which now holds negative "N".

Next, in block 310, the "A" value is loaded into "X" register 206 with the most significant 1 bit at the n−1 bit. Then, in block 312, the pointer in "PX" register 222 is set to point to the bit containing the least significant bit of "A". If "A" is longer than the length of "X" register 206, the "PX" value will be negative. Indeed, if "A" is greater than $2^N$ where "N" is the modulus, then "PX" register 222 will be negative. The rest of "A" will be stored in temporary storage 208 to be fed into "X" register 206 as iterations of the calculations are done.

Now that "X" register 206 and "Y" register 214 are loaded, as are "PX" and "PY" registers 222 and 224, in block 314, comparator 226 initially checks to see if "PX" register 222 is greater than "PY" register 224. This is the trivial case where A is already the least residue of A mod N, so the result is simply A. In this trivial case if that is true, then in block 316, the contents of "X" register 206 are outputted through mux 220 and the process ends.

If "PX" register 222 is not initially greater than "PY" register 224, then in block 318, complement/true mux 217 receives the true output 215 of the "Y" register 214. Then, the contents of "X" register 206 are added to the contents of complement/true mux 217 using full adder 210 and the results are outputted to "Z" register 218. In block 320, "Z" register 218 is checked to see if the first bit is 1. This is the equivalent of checking to see if "Z" is negative since the first bit is the sign bit. If "Z" register 218 is not negative, then in block 322, the contents of "Z" register 218 is placed into "X"

register 206. Following that, in block 324, if the n−1 bit of "X" register 206 does not contain a 1, then "X" register 206 is left-shifted one bit and "PX" register 222 is incremented by 1 until the n−1 bit of "X" register 206 holds a 1 or the register value of "PX" register 222 is greater than the register value of "PY" register 224. As "X" register 206 is left-shifted, the bits of "A" that are stored in storage 208 are shifted into "X" register 206 one bit at a time. After all the bits of "A" stored in storage 208 are used up, 0's will be added to the least significant bit of "X" register 206 if additional left-shifts of "X" register 206 are required. In block 326, "PX" register 222 is compared to "PY" register 224 to see if the contents of "PX" register 222 is greater than the contents of "PY" register 224. If "PX" is greater than "PY", in block 328, the contents of "X" register 206 is output as the answer. If "PX" is less than or equal to "PY", the method returns to block 318 and the contents of "X" register 206 and "Y" register 214 are added with the result stored in "Z" register 218.

Returning to block 320, if the content of "Z" register 218 is negative (i.e., if the most significant bit (first bit) of "Z" register 218 is 1), then in block 330 "PX" register 222 is checked to see if it is equal to "PY" register 224. If they are equal, then "X" register 206 is outputted and the processing stops. If not, then in block 332, "X" register 206 is shifted one bit to the left and "PX" register 222 is incremented by one. Then, the contents of "X" register 206 plus the contents of "Y" register 214 are added together again and the result is stored in "Z" register 218 in block 318. Note that in block 332, "X" register 206 was left-shifted one bit and "PX" register 222 was incremented by one. The result of the addition was not placed in "X" register 206.

The following is an example of a modulo reduction, A mod N, calculation using the method of the present invention. This example will use an eight-bit register size for each of "X" register 206, "Y" register 214 and "Z" register 218. Also, in this example, "A" will be 200 in decimal and "N" will be 27 in decimal. First, both "A" and "N" need to be in binary form. For "A", value 200 in decimal form is equal to 11001000 in binary form. "N", which is 27 in decimal, is equal to 11011 in binary. In a first step, the "N" value is placed into "Y" register 214. The first bit of "Y" register 214 will be 0, which is the sign bit. The second bit will also be 0, and that bit is the overflow bit. Then, the first (most significant) one of "N" will be placed in the n−1 bit, followed by 1011 and in this example, 0, because this example uses eight-bit "Y", "X" and "Z" registers. The content of register "Y" will initially be 00110110. Next, "PY" register 224 is set to 1, because bit 1 contains the least significant bit of "N".

Then, the contents of "Y" register 214 is outputted to true/complement mux 217 via complement output 213. Each of the bits in "Y" register 214 is inverted (i.e., 0's become 1's and 1's become 0's). Thus, the contents of true/complement mux 217 holds a value of 11001001. Then, in the next step, a 1 is sent to "X" register 206 and is added to the contents of true/complement mux 217 in full adder 210. The result is then outputted back to "Y" register 214, which outputs that value through true output 215 to true/complement mux 217. True/complement mux 217 now contains the value 11001010, which is the negative of the original "N" value.

In the next step, "A" is loaded into "X" register 206 such that the most significant one bit of "A" is in the n−1 bit of "X" register 206. In this case it will have 0 for the sign bit, 0 for the overflow bit and then, beginning with "A", will have a 110010 placed into "X" register 206. Two bits of "A", the last two 0's, did not fit in "X" register 206, and are stored in storage 208. Because two bits are stored in storage 208, we go past the zero bit of "X" register 206 to find them, so "PX" register 222 is set at negative two (−2).

Then, the contents of "X" register 206 and "Y" register 214 are added. The result is placed into "Z" register 218. In this example, the result of adding "X" register 206 and "Y" register 214 together is 11111100. This result is less than 0, because the sign bit of "Z" register 218 has a 1 in it indicating that it is a negative number. Next, registers "PX" and "PY" are compared to see if they are equal, which they are not since PY=1 and PX=−2. Therefore, "X" register 206 is shifted left by one bit and "PX" register 222 is incremented by one. Therefore, "X" register 206 now stores 01100100 and "PX" register is negative 1. The contents of "X" register 206 is again added to the contents of "Y" register 214 and the result is put back into "Z" register 218. The result in this case will be 00101110. Again, a check is made to see if this value is less than 0. In this case, there is a 0 in the sign bit indicating that it is a positive number. Therefore, the value in "Z" register 218 is moved into "X" register 206, and "X" register 206 will now store 00101110.

Next, "X" register 206 is checked to see if there is a 1 in the n−1 bit. The n−1 bit is the third bit from the left of "X" register 206. In this case there is already a 1 there, so left-shifting is not needed, and "PX" register 222 is not incremented. Since "PX" register 222 is still less than "PY" register 224, the contents of "X" register 206 and "Y" register 214 are added together and the result stored in "Z" register 218.

Adding "X" register 206 and "Y" register 214 together yields 11111000. That number is less than 0, because there is a 1 in the sign bit of "Z" register 218. Therefore, since "PX" register 222 does not equal "PY" register 224 at this point, we left-shift "X" register 206, and increment "PX" register 222 by one. Thus, "X" register 206 now holds a 010111100, and "PX" register 222 is now 0. The new "X" register 206 content is added to "Y" register 214 and the result of 00100110 is stored in "Z" register 218. This result is greater than 0 because there is a 0 in the sign bit. The content of "Z" register 218 is moved to "X" register 206. "X" register 206 now holds 00100110. Again, there is already a 1 in the n−1 bit, so "X" register 206 need not be shifted. The contents of "X" register 206 and the contents of "Y" register 214 are added again. Doing so yields 11110000. Again, the result is negative and "PX" register 222 is still not equal to "PY" register 224 at this point. Therefore "X" register 206 is left-shifted by one bit, which yields 01001100. Also, "PX" register 222 is incremented by one bit, so "PX" register 222 is now equal to 1.

The "X" register 206 value is added to the "Y" register 214 value and the result is 00010110. This number is greater than 0, so the contents of "Z" register 218 replaces the contents of "X" register 206. Now, the n−1 bit of "X" register 206 has a 0 (i.e., the third bit from the left is 0). "X" register 206 is shifted to the left one bit. The result is that "X" register 206 has 00101100 stored. Now, a 1 is in the n−1 bit and no more shifting is required. Also, "PX" register 222 is incremented by 1 such that the "PX" register=2. Since "PX" register 222 now exceeds "PY" register 224, the process stops and an answer is outputted. The answer, in binary, will be the value stored in the register from the n−1 bit down to the "PX" register 222 value bit. So, in this case it will be from the n−1 bit to the 2 bit—or the binary number 1011. Binary number 1011 is equal to 11 in a decimal system, which indeed is the remainder left over when 200 is divided by 27. The quotient can be recovered by counting the number of multiples of N subtracted.

Figure 4:
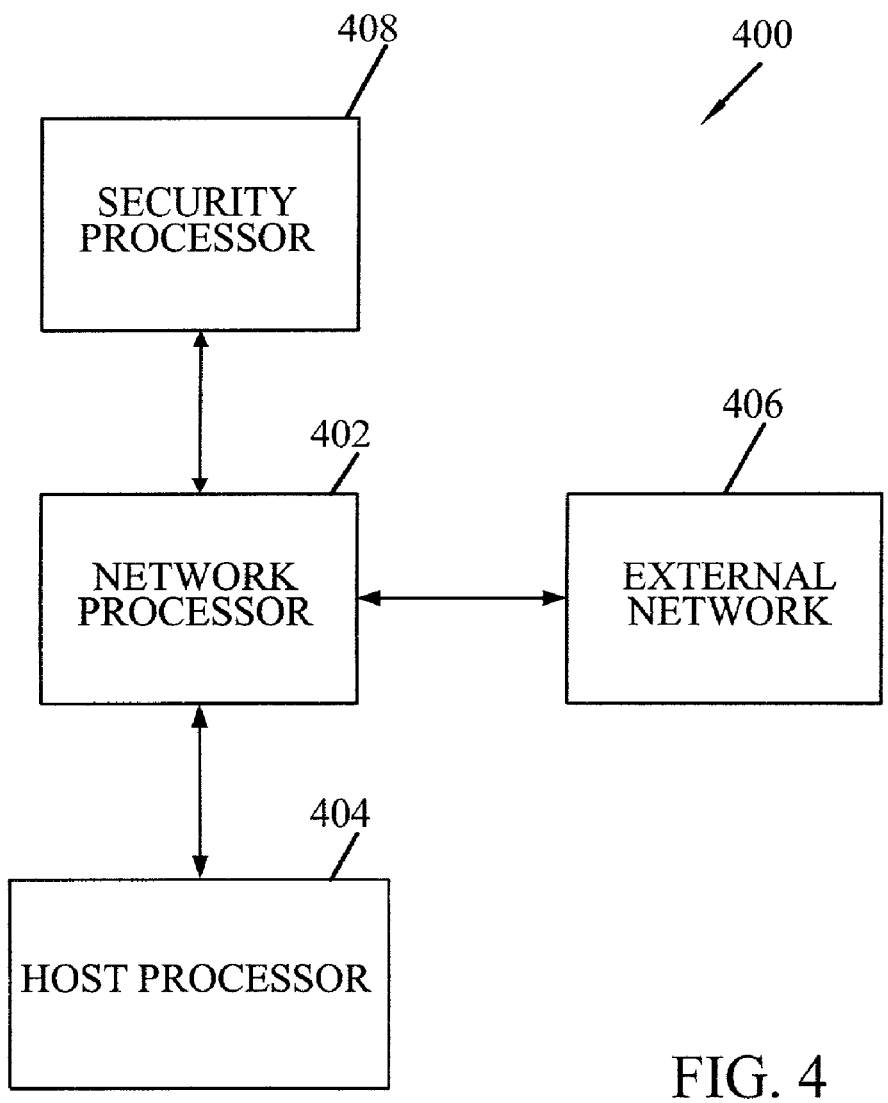
FIG. 4 is a simplified block diagram of a computer system architecture suitable for use in implementing a post processor according to an alternative embodiment of the present invention.

FIG. 4 is a simplified block diagram of a computer system architecture 400 suitable for use in implementing a post processor according to an alternative embodiment of the present invention. Architecture 400 includes a network processor 402 coupled for sending and receiving, for example, Internet protocol security (IPSec) data packets to and from an external network 406 such as, for example, the Internet. IPSec is a standard Internet security protocol as specified in "Request for Comment" (RFC) 2401, 2402 and 2406. A host processor 404 is coupled to accept and provide the data packets to and from network processor 402.

A security or cipher processor 408, coupled to network processor 402, handles certain computations associated with security processing of, for example, inbound and outbound IPSec data packets to reduce computational demands on network processor 402. These computations include, for example, modular operations used to implement security algorithms such as the RSA algorithm, including operations such as modular exponentiation and multiplication. In other embodiments, security processor could be coupled directly to host processor 404 to reduce its computational load or to remote processors accessible through external network 406. Security processor 408 may be, for example, an application specific integrated circuit (ASIC) built using standard manufacturing techniques.

Figure 5:
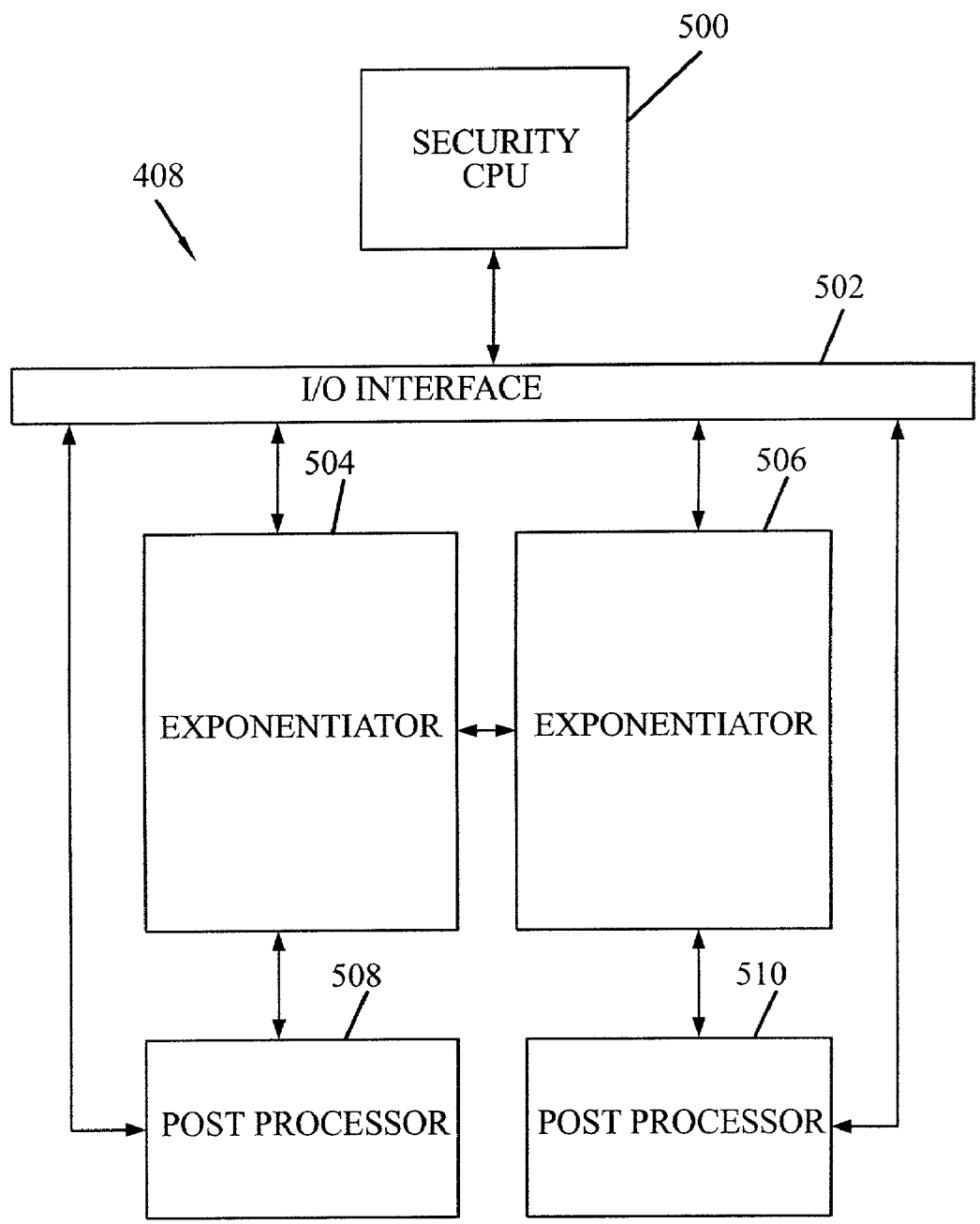
FIG. 5 is a high-level simplified block diagram of a security processor in the computer system architecture of FIG. 4.

FIG. 5 is a high-level simplified block diagram of security processor 408. A central processing unit (CPU) 500 is coupled to an internal control and data input/output (I/O) interface 502. CPU 500 manages the processing associated with implementing, for example, the RSA algorithm and accepts data and keys for security processing from network processor 402 or host processor 404 over a conventional data bus (not shown). This data may include, for example, either plain text or cipher text for encryption or decryption, as may be applicable. Fully-processed encrypted or decrypted data is returned by CPU 500 to network processor 402 or host processor 404.

Exponentiators 504 and 506 perform modulo multiplication and exponentiation, are coupled to CPU 500 through I/O interface 502, and operate in parallel. Exponentiators 504 and 506 each may handle values having a bit length of, for example, 1,024 bits. Additional exponentiators (not shown) may be added in other embodiments to independently operate in parallel with exponentiators 504 and 506. CPU 500 selects either exponentiator 504 or 506 if currently available or waits until one is free. Post processors 508 and 510 are coupled respectively to exponentiators 504 and 506 for providing modulo reduction calculations as required to complete the multiplication and exponentiation calculations in exponentiators 504 and 506. Typically, two numbers, A and N, are sent to post processor 508 or 510 for computing A mod N. In addition, a third number B may also be sent to post processor 508 or 510 for computing (A+B) mod N. Post processors 508 and 510 are also coupled directly to I/O interface 502 for exchanging control signals with CPU 500.

When the processing to be done by security processor 408 includes modulo arithmetic, CPU 500 provides the input values to exponentiator 504 or 506 necessary for modulo calculations. These input values may include, for example, operands A and B and modulus N when calculating AB mod N. The result of this calculation is returned through I/O interface 502 for completion of security processing to CPU 500. CPU 500 may exchange control information with exponentiators 504 and 506 and/or post processors 508 and 510 regarding the size, for example in bits or bytes, of one or more of the operands and/or of the final computational result.

Exponentiators 504 and 506 may optionally be coupled to work in tandem for performing modular operations on numbers having twice the bit length that can be handled by a single exponentiator. For example, if each exponentiator 504 or 506 can operate on a maximum 1,024 bit-length number, then the combination of the two exponentiators can operate on a 2,048 bit-length number. An example of such tandem operation and other aspects of the structure and operation of exponentiators 504 and 506 discussed herein is further described in U.S. Provisional Application Ser. No. 60/297,833, filed Jun. 13, 2001 (titled MULTIFUNCTION PIPELINED MODULO PROCESSOR by Takahashi et al.) and also in U.S. Non-Provisional application Ser. No. 09/971,325, filed concurrently herewith (titled CIRCUIT AND METHOD FOR PERFORMING MULTIPLE MODULO MATHEMATIC OPERATIONS by Takahashi et al.), each of which is incorporated by reference herein.

Each of post processors 508 and 510 also may support modulo arithmetic independently of computations being performed in exponentiators 504 and 506. For example, security CPU 500 may request post processor 508 or 510, depending on which one is available for processing, perform a modulo reduction of the form A mod N. Security CPU 500 passes the A and N operands to the post processor and the final result is returned to security CPU 500 directly through I/O interface 502. When computing keys for the RSA, Diffie-Hellman or other algorithms, security CPU 500 may request, for example, post processor 508 to perform an A mod N calculation and exponentiator 504 to perform an $A^E$ mod N calculation.

Figure 6:
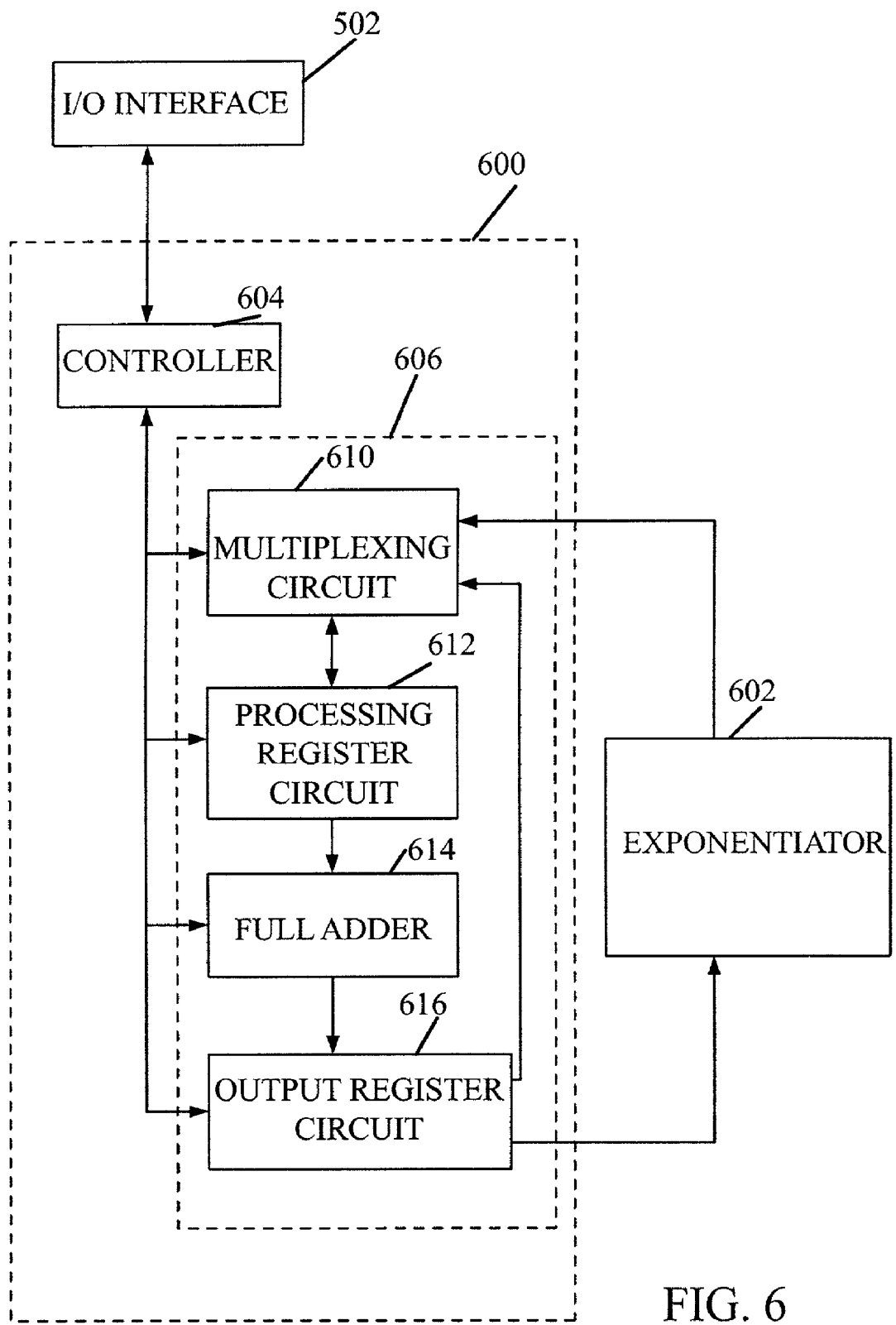
FIG. 6 is a simplified functional block diagram of a post processor, according to an alternative embodiment of the present invention, as used in the security processor of FIG. 5.

FIG. 6 is a simplified functional block diagram of a post processor 600, which may be used as post processor 508 or 510 of FIG. 5. An exponentiator 602 is coupled to processor 600 and generally represents either exponentiator 504 or 506 of FIG. 5. Processor 600 is coupled to I/O interface 502 as discussed above.

Post processor 600 generally supports the modulo functions of A mod N and (A+B) mod N. In some cases, exponentiator 602 may provide operand A to post processor 600 in carry save adder form in which A is represented by a carry word and a save word. Post processor 600 comprises a full adder (discussed below) that is used to add the carry word and save word to obtain a binary value of A, which is then used by post processor 600 in calculating A mod N. Post processor 600 also may be used as necessary to support the full addition of A and B to support other calculations performed by exponentiator 602. The foregoing functions support Montgomery multiplication and exponentiation that are handled by exponentiator 602, which may use, for example, a plurality of carry save adders operated in a pipelined manner to perform the Montgomery calculations by calculating partial products. As will be discussed below, post processor 600 also may be used to support calculations for converting operands A and B into a conventional Montgomery form of $A = Ar^{2(n+8)}$ mod N and $B = Br^{2(n+8)}$ mod N prior to beginning Montgomery calculations. More specifically, post processor 600 may be used to calculate the value of $r^{2(n+8)}$ mod N (where r>N and n is the size in bits of the value N).

Post processor 600 includes a processing subsystem 606 that is controlled by a controller 604. Processing subsystem 606 includes a multiplexing circuit 610, a processing register circuit 612, a full adder 614, and an output register circuit 616 coupled as illustrated to communicate initial operands, intermediate calculations and final results. During normal operation, output register circuit 616 provides intermediate modulo reduction computational results back to multiplexing circuit 610, as discussed further below.

Full adder 614 is used to compute (A+B) to support exponentiator 602 as mentioned above. Also, post processor 600 calculates (A+B) mod N by initially computing (A+B) using full adder 614 and then performing modulo reduction of the resulting sum to determine a final result for (A+B) mod N.

Controller 604 includes finite state machines (not shown) configured to exchange appropriate control signals with processing subsystem 606, including, for example, multiplexing control signals and status control flags, as discussed in more detail below. Controller 604 is coupled to I/O interface 502 for exchanging control information with CPU 500, such as operand size and busy status.

Multiplexing circuit 610 accepts operands from exponentiator 602, and output register circuit 616 provides the final modulo reduction result to exponentiator 602. Processing register circuit 612 stores intermediate results in temporary holding registers (see FIG. 7) and performs bit shifting as required during calculations, and output register circuit 616 stores the output from full adder 614 and performs bit shifting as required for alignment of the final output result.

Figure 7:
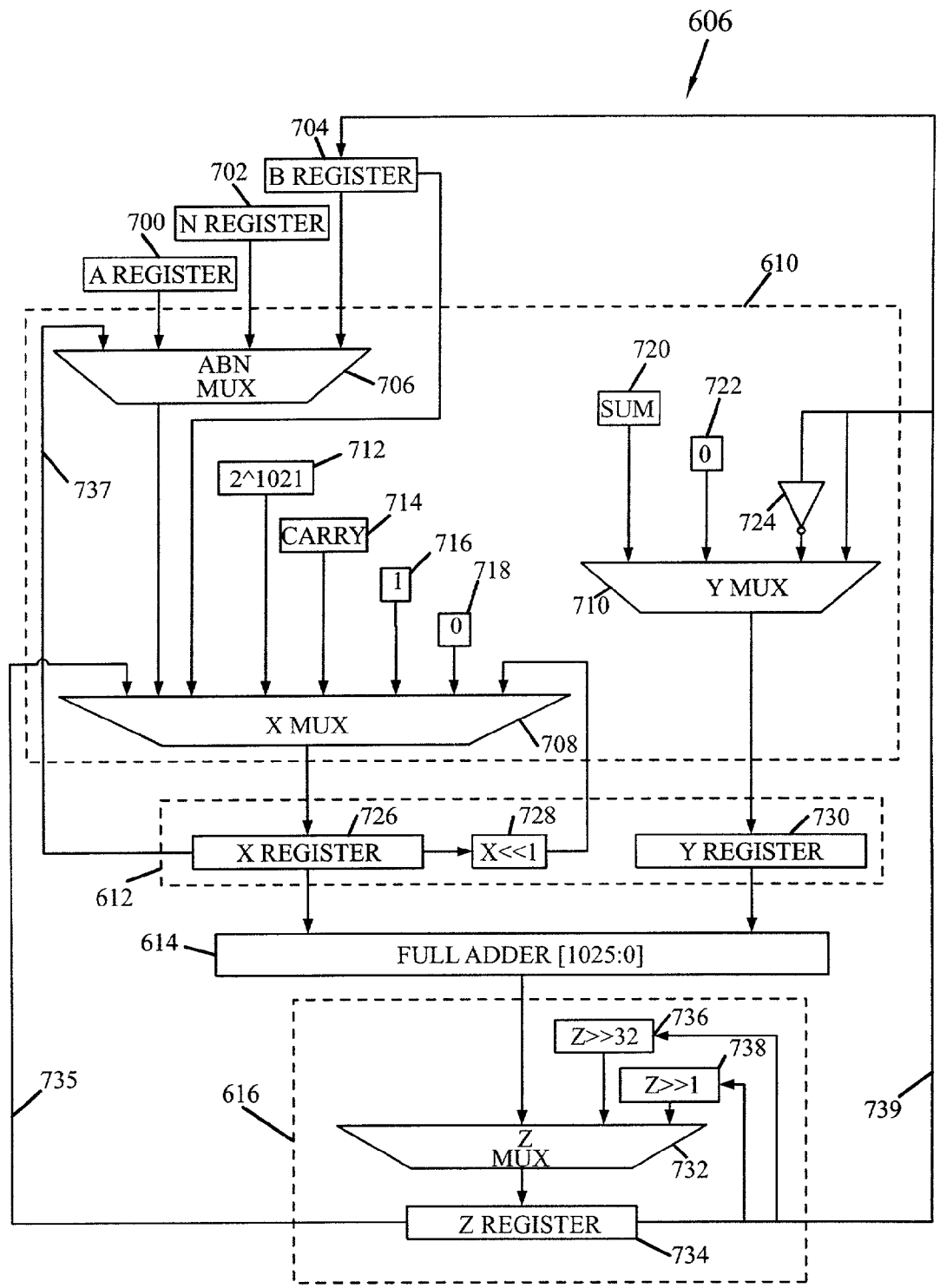
FIG. 7 is a more-detailed functional block diagram of a processing subsystem in the post processor of FIG. 6.

FIG. 7 is a more-detailed functional block diagram of processing subsystem 606 of FIG. 6. A register 700 used for loading operand A, a register 702 for loading the modulus N, and a register 704 for loading operand B provide inputs to an ABN multiplexer ("mux") 706.

Multiplexing circuit 610 comprises muxes 706, 708, and 710 configured as follows. The output of ABN mux 706 is provided to X mux 708, which has several inputs. A first input 712 corresponds to a binary value having a one as the most significant bit followed by a number of zero bits (e.g., 100000 in binary) and is used for converting operands into Montgomery form in preparation for Montgomery multiplication in exponentiator 602 (the value of input 712 corresponds to the value $r^{2(n+8)}$ as discussed further below). An example of input 712 is the value of $2^{1021}$ expressed in binary form. As also mentioned above for the case of value A being in carry save adder form, a carry input 714 is used for adding a carry word to a sum word for calculating a final product using full adder 614. A one input 716 corresponds to a binary value having a one as the least significant bit preceded by all zero bits (e.g., 000000000001). A zero input 718 corresponds to a binary value having all zero bits (e.g., 0000000000).

Y mux 710 has a sum input 720 used for adding a sum word to a carry word from X mux 708 (as mentioned above) to convert them to normal full adder representation. A zero input 722 corresponds to a binary value having all zero bits (e.g., 00000000). An inverter 724 is used to invert all bits of output values from a Z register 734 prior to providing as an input to Y mux 710.

Processing register circuit 612 comprises an X register 726 used to store values from X mux 708 and a Y register 730 used to store values from Y mux 710. A shifter 728 is used to left-shift the value in X register 726 one bit at a time and fill the right bit positions with zeros. As will be recognized by one of skill in the art, shifter 728 and register 726 may be implemented using a shift register or other known circuits that include a register for storing a value and a combinatorial portion for shifting the value stored in the register element. A feedback path 737 is used during the loading of X register 726 through ABN mux 706 as discussed below.

Output register circuit 616 comprises a Z mux 732 and a Z register 734, which stores intermediate and final output values from full adder 614. A shifter 738 is used to right shift the value in Z register 734 one bit at a time and fill the left bit positions with zeros. A shifter 736 is used to right shift the value in the Z register a fixed number of bits (e.g., 32 bits) at a time and fill the left bit positions with zeros. As will be recognized by one of skill in the art, shifters 736 and 738 and Z register 734 may be implemented using shift registers or other known circuits that include a register for storing a value and a combinatorial portion for shifting the value stored in the register element. A feedback path 735 is used to load a result in Z register 734 back into X register 726 through X mux 708, and a feedback path 739 is used to load a result from Z register 734 back to Y register 730 through Y mux 710, each as discussed below.

Figure 8:
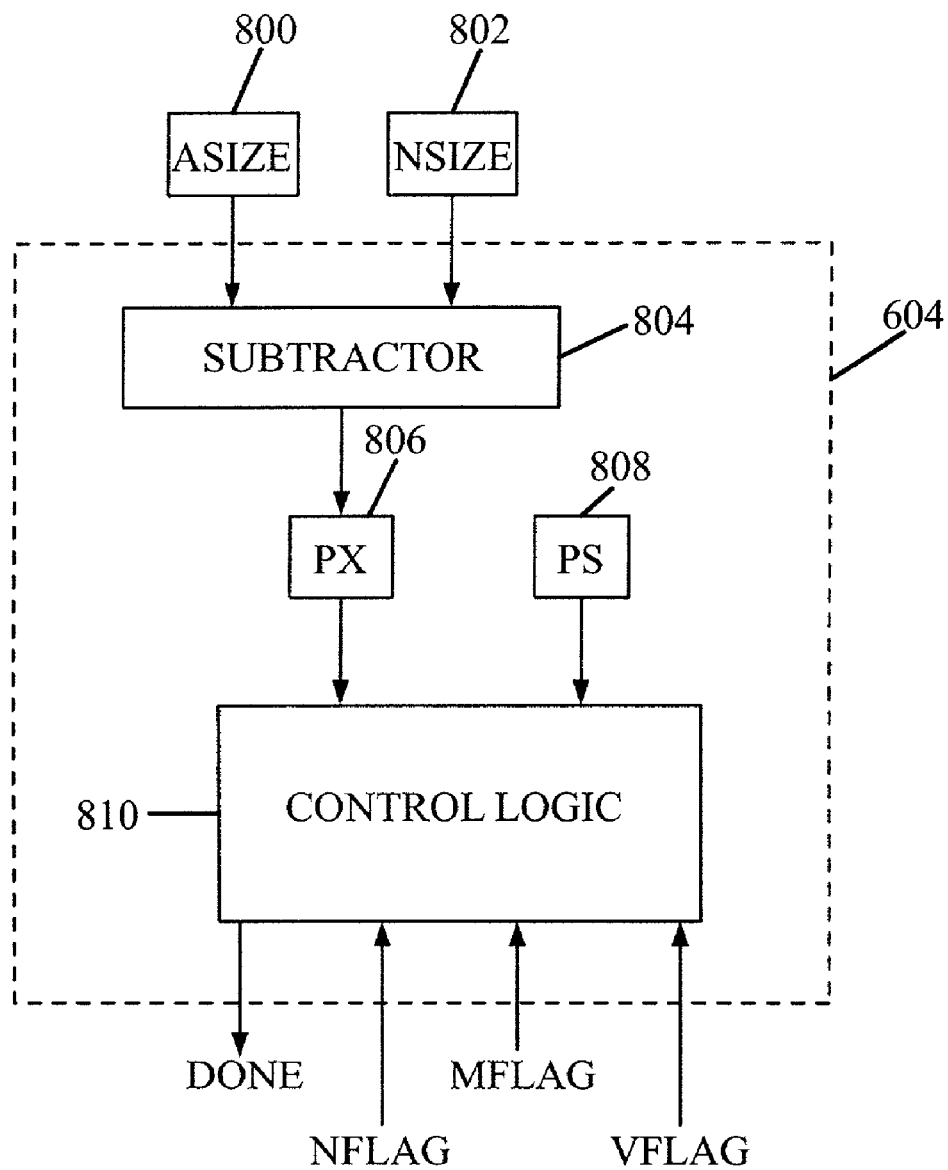
FIG. 8 is a functional block diagram of a controller in the post processor of FIG. 6.

FIG. 8 is a functional block diagram of controller 604. A register 800 is loaded with the size ASIZE of the A operand and a register 802 with the size NSIZE of the N modulus by CPU 500 through I/O interface 502 (see FIG. 5). Controller 604 comprises a subtractor 804 that substracts NSIZE from ASIZE, and the result is stored in PX register 806 (i.e., PX=ASIZE−NSIZE). Subtractor 804 may also be used when determining whether NSIZE is greater than ASIZE, as discussed in the procedure of FIG. 11A below. PX register 806 and a PS register 808 are used as counters during processing to keep track of the extent of left-shifting of operands, to determine when to terminate modulo reduction when a counter reaches a predetermined value (e.g., zero), and to properly re-align the final output result. Specifically, in one approach the value of counter PX indicates the adjusted difference in the number of binary bit positions between the A and N values and accordingly indicates the number of successive subtractions of N that must be made from A to obtain the final modular result. The value of counter PS indicates the number of bits of left-shifting done to N during alignment and thus the number of bits of right-shifting necessary to re-align the final modular result.

Control logic 810 monitors and adjusts the PX and PS values during calculations and monitors several register status control flags (NFLAG, MFLAG, and VFLAG) to adjust the handling of calculations as discussed further below. Control logic 810 also sets the value of a status control flag (DONE) monitored by CPU 500. Control logic 810 sets signal DONE to indicate when processing is complete.

Figure 9:
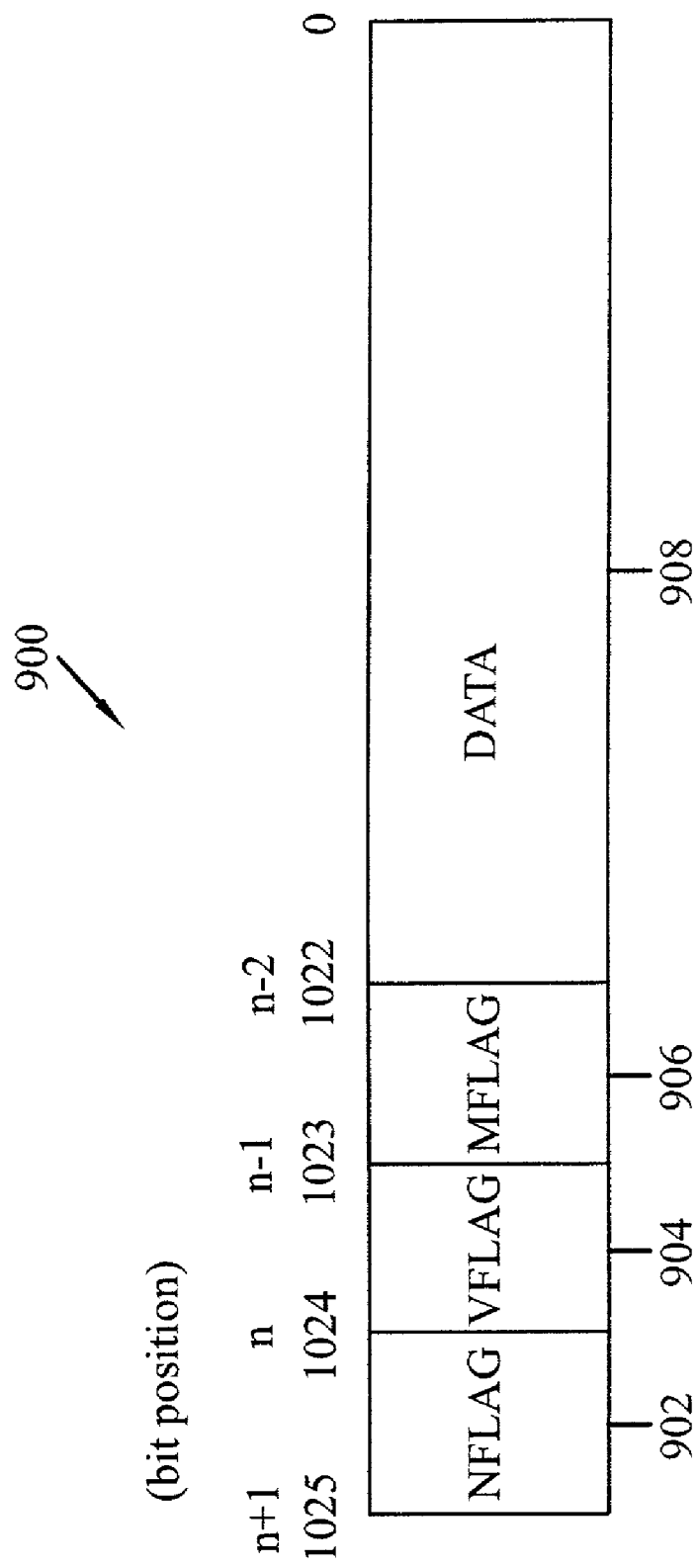
FIG. 9 is a simplified diagram of a data structure for an X register in the processing subsystem of FIG. 7.

FIG. 9 is a simplified diagram of a register data structure 900. X register 726, Y register 730, and Z register 734 each use data structure 900. In general, each register stores a value having a maximum bit length of n bits. For example, if n=1,024 bits, then X register 726 can store an operand with a maximum size of 1,024 bits. The operand of n bit size is stored in bit positions 0 to n−1 in data structure 900, with the most significant bit of the value located in position n−1 and used as a control flag MFLAG 906 as indicated in FIG. 9. The first two bits 902 and 904 of each register are used as control flags NFLAG and VFLAG. The remaining bit positions 0 to n-2 are used to store the remaining bits of the operand (indicated in FIG. 9 as data 908 ) in the register. For example, for a 1,024 bit size value the most significant bit is in bit position 1023 and is used as flag MFLAG 906.

As discussed further below, control flag VFLAG is used to indicate the overflow status of the value stored in X register 726. An overflow condition is indicated when VFLAG=1. Control flag NFLAG is used to indicate whether the value stored in Z register 734 is a negative value, which is indicated when NFLAG=1.

Figure 10:
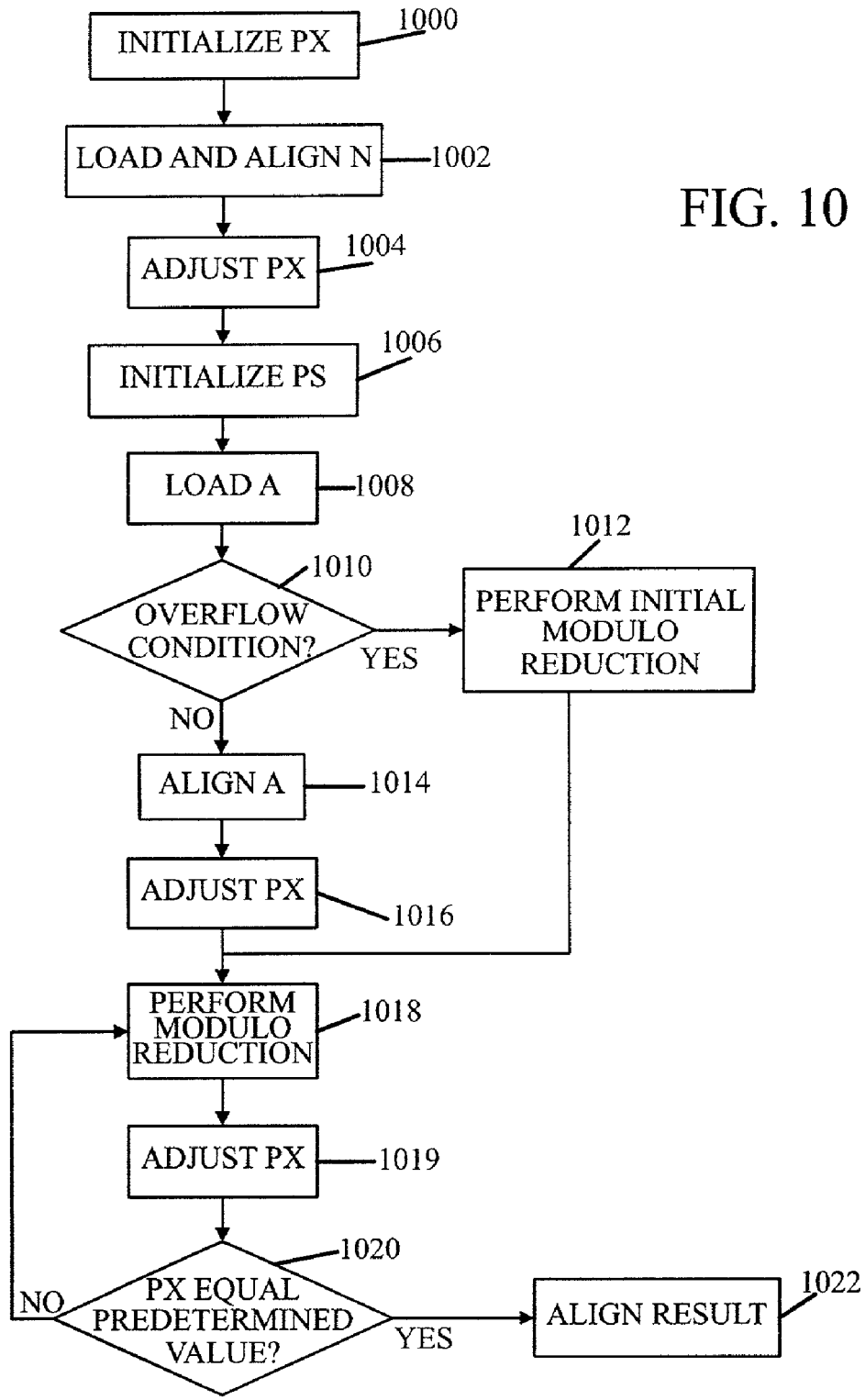
FIG. 10 is a high-level simplified flow chart of a procedure for performing modulo reduction according to the alternative embodiment of the present invention.

FIG. 10 is a high-level simplified flow chart of a procedure for performing modulo reduction according to the alternative embodiment of the present invention. In block 1000, counter PX is initialized in preparation for a new modulo reduction calculation (i.e., Z=A mod N). In block 1002, the value of N is loaded into X register 726 and aligned by left-shifting of bits as discussed in more detail below. In block 1004, counter PX is adjusted to reflect the number of bits of left-shifting.

In block 1006, counter PS is initialized based on the extent of left-shifting done in block 1004. Counter PS will be later used to align the final result with bit-by-bit shifting. In block 1008, the value of A is loaded into X register 726. In block 1010, if the VFLAG loaded in X register 726 along with value A indicates that an overflow condition exists, then according to the present invention an initial modulo reduction in block 1012 is immediately performed.

An overflow condition may occur, for example, when calculating (A+B) mod N, as discussed further below, in which post processor 600 first calculates (A+B), values A and B are, for example, 1,024 bit values, and their sum requires a 1,025 bit representation due to a carry result from the most significant bit position n−1 during addition. The sum (A+B) is loaded into X register 726 and post processor 600 places a one in bit position n of X register 726, which corresponds to VFLAG=1.

The initial modulo reduction in block 1012 is done because the existence of the overflow state indicates that at least one modulo reduction iteration will be required since A is necessarily greater than N in order for the overflow condition to exist. According to the present invention, the processing time is reduced when such an overflow condition is present because the additional queries normally made regarding whether modulo reduction has been completed are not done in the case of this initial modulo reduction. Instead, value N is immediately subtracted once from value A prior to entering the normal modulo reduction iteration procedure. An advantage achieved by the initial modulo reduction is that a carry result does not need to be maintained in post processor 600 hardware during subsequent modulo reduction calculations.

If an overflow condition does not exist, then in block 1014 value A is aligned by left-shifting, and in block 1016 counter PX is adjusted to reflect the number of bits of left-shifting done to value A in block 1014. In block 1018, normal iterations of modulo reduction are done in general by iterative subtraction of N from A as discussed below. In block 1019, counter PX is adjusted after certain modulo reduction iterations depending on the characteristics of the intermediate modulo reduction result, as discussed below.

In block 1020, modulo reduction is terminated when counter PX equals a predetermined value (e.g., a value of zero), at which time the output value in Z register 734 is aligned by appropriate right-shifting in block 1022, as discussed further below. If counter PX has not yet reached the predetermined value, then an additional subtraction of N from A is done (i.e., Z=A−N) in block 1018 and counter PX again adjusted in block 1019. For example, when counter PX is decremented to a value of zero for the embodiment of the present invention described below, no additional subtraction of modulus N from the reduced value of A is required and the modulo reduction is ended.

Figure 11A:
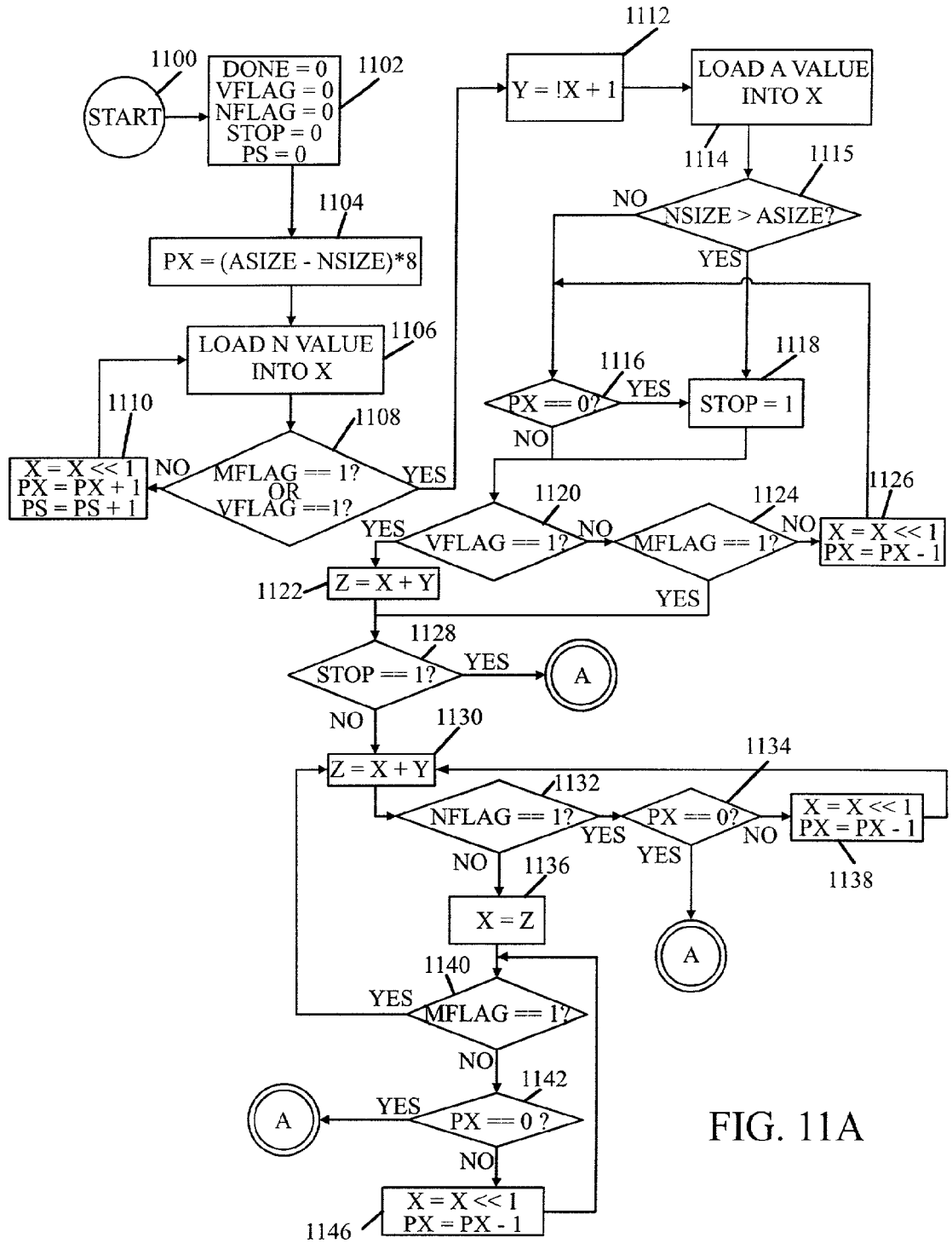
FIGS. 11A and 11B are more-detailed flow charts of a procedure for performing modulo reduction, which may use the post processor of FIG. 6, according to the present invention.
Figure 11B:
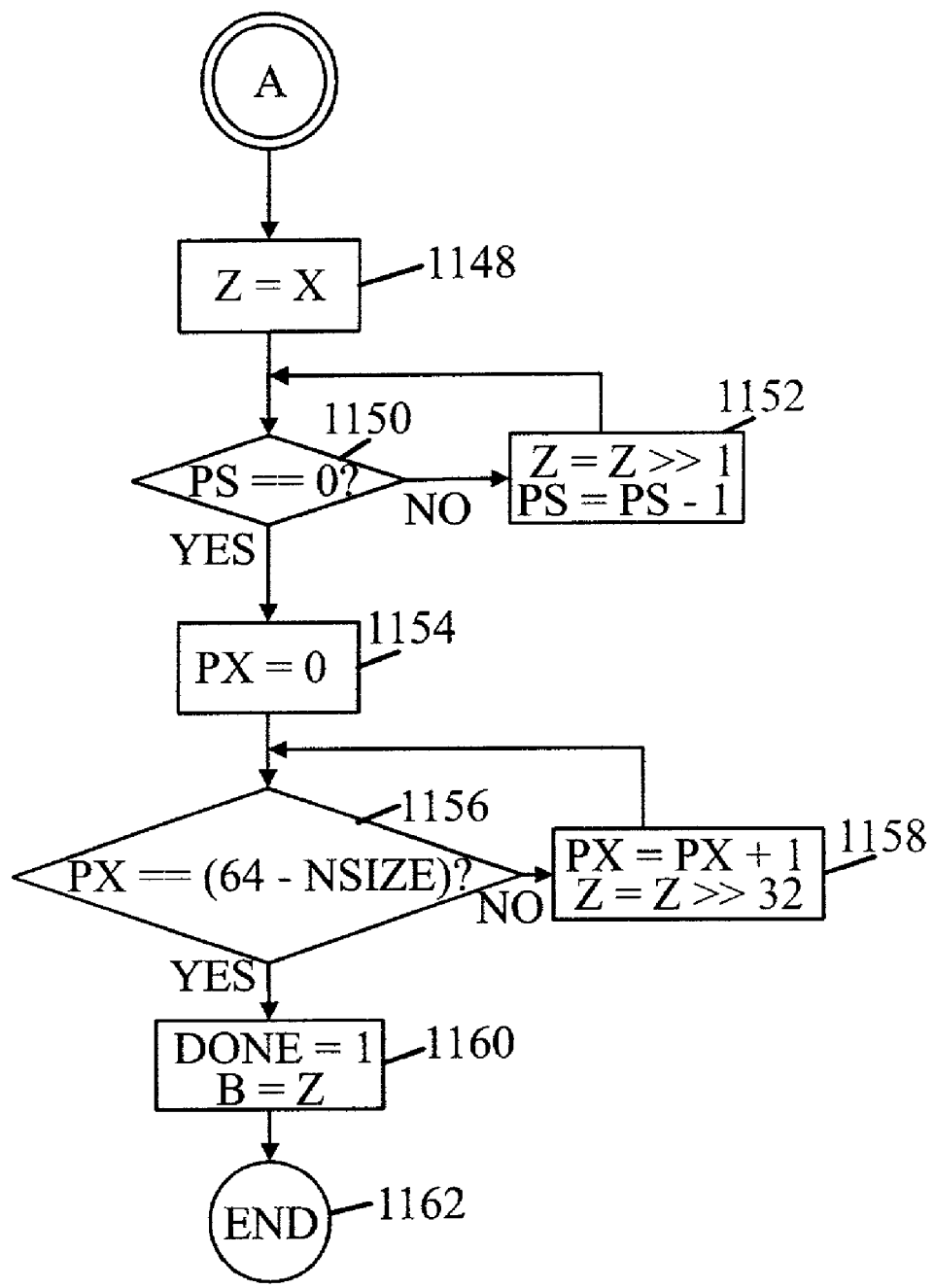

FIGS. 11A and 11B are more-detailed flow charts of a procedure for performing modulo reduction, which may use post processor 600, according to the present invention. The procedure starts in block 1100 and generally corresponds to the simplified procedure set forth in FIG. 10. The following description will first describe a modulo reduction (i.e., A mod N) in which operand A and modulus N have been first loaded into A register 700 and N register 702 in preparation for this calculation. The A register 700 is, for example, 32 bits in size and coupled to a memory (not shown) having a 32-bit port for reading the A value one word at a time, and N register 702 is, for example, 1,024 bits in size.

In block 1102, the DONE signal is set to zero indicating that post processor 600 is currently busy with a modulo calculation. Also, a flag STOP (discussed below), control flags VFLAG and NFLAG, and counter PS are initialized to zero. In block 1104, counter PX is initialized, for example, to the value (ASIZE−NSIZE)*8. ASIZE is the size of operand A in bytes, and NSIZE is the size of modulus N in bytes. Controller 604 converts the difference (ASIZE−NSIZE), which is in bytes, to its corresponding value in bits, for example, by shifting the contents in PX register 806, which contains the result of (ASIZE−NSIZE), by three bits to the left, which is equivalent to multiplication by 8. Subsequent incrementing and decrementing of the PX counter as described below for FIG. 11A is in done in one-bit increments.

In block 1106, value N is loaded from N register 702 to X register 726 using ABN mux 706. According to the present invention, value N is loaded into X register 726 in bit increments of a fixed size, for example 32-bit increments (or words) using a little-endian format. The most significant word of, for example, value N is loaded into the most significant 32 bits (or word) of X register 726 (i.e., loaded starting at bit position n−1). The next most significant word of value N is then loaded into the next most significant word of X register 726. Feedback path 737 is used during this loading by feeding back to ABN mux 706 the prior words of N that were already loaded into X register 726 for reloading with the next word of value N. This continues until all words of value N have been loaded. The advantage of loading in this manner is that the extent of bit-by-bit left-shifting required of N as described below is significantly reduced, which reduces the number of clock cycles required overall to obtain a final computational result.

In blocks 1108 and 1110, shifter 728 aligns N by shifting the bits of N to the left one bit at a time until a one bit is in the most significant bit position n−1 (i.e., MFLAG from X register 726 is equal to one). Also, to properly handle a situation in which the contents of X register 726 is the result of a calculation resulting in an overflow in which VFLAG=1 (such as for example the result of an (A+B) addition, as described herein, having an overflow result), block 1108 also (in addition to checking whether MFLAG=1) checks to see if VFLAG=1 during left-shifting of the contents of X register 726. Counter PX and counter PS are each incremented for each one bit shift left. Counter PS is used to store the number of bits that value N was left-shifted so that the final result can later be right-shifted by the same number of bits. As mentioned above, counter PS is later used to align the final result (this final alignment is discussed below).

When MFLAG=1, then in block 1112, the aligned value of N in X register 726 is modified to prepare for subtraction from value A using two's complement addition as follows: Value N is passed unchanged to Z register 734 by loading a zero using input 722 into Y register 730 and adding the contents of X register 726 and Y register 730 using full adder 614. Next, the value of N in Z register 734 is inverted using inverter 724 and loaded into Y register 730 (this loading uses feedback path 739 and Y mux 710 ). Input 716 is used to load a one into X register 726, which is added to the inverted N value (the inverse of N is indicated as !N) in Y register 730 using full adder 614. The result of this addition is stored in Z register 734 and then loaded unchanged into Y register 730. Thus, the two's complement of the initial aligned N value is now in Y register 730 (this operation is indicated in block 1112 by Y=!X+1).

In block 1114, value A is loaded into X register 726 from A register 700. Similarly as described for value N above, value A is loaded into X register 726 in fixed bit-size increments (or words) of, for example, 32-bit size using little endian format. In other words, the most significant word of value A is first loaded into the most significant word of X register 726 and lesser significant words of A are sequentially loaded in descending significance order into X register 726. In block 1115, if NSIZE is greater than ASIZE, then no modulo calculation is required as the value of A is already the modulo result and in step 1118 the STOP flag is set to one, which will terminate the procedure without modulo reduction.

In block 1116, if PX is equal to zero (indicated in FIG. 11A as PX=0), then the STOP flag is set to one, which will terminate the procedure without modulo reduction. Counter PX may be equal to zero in certain cases even if NSIZE and ASIZE are equal, and this condition indicates that the value of A is already the modulo result.

Next, in block 1120, flag VFLAG from X register 726 is checked to see if the value of A in X register 726 is the sum from a prior addition of two numbers (e.g., operands A and B when calculating (A+B) mod N as discussed below) that resulted in an overflow condition, in which case VFLAG=1. If VFLAG=1, then in block 1122, an initial modulo reduction is done as discussed above by subtracting N from A using two's complement addition (indicated as Z=X+Y). It should be recalled that Y register 730 contains the two's complement of aligned value N and X register 726 contains value A. The resulting value in Z register 734 is loaded back into X register 726 using feedback path 735.

If VFLAG is not equal to 1, then in blocks 1124 and 1126, value A is aligned by shifting left one bit at a time using shifter 728 and decrementing counter PX for each shift. The shifting is stopped when MFLAG=1 in step 1124 or PX=0 in step 1116.

In block 1128, if flag STOP=1, then modulo reduction is terminated, and in block 1148 the value in X register 726 is passed unchanged to Z register 734 as the final result (indicated as Z=X) by simply adding the value in X register 726 to a zero value loaded into Y register 730 using zero input 722. If STOP=0, then iterative modulo reduction is begun in block 1130 in which modulus value N is subtracted from the current value in X register 726.

In block 1132, the subtraction result, which is loaded from full adder 614 into Z register 734, is checked to see if it is negative (i.e., NFLAG from Z register 734 is checked to see if it is equal to one). If the result is negative and in block 1134 counter PX=0, then modulo reduction stops and in block 1148 the final result is loaded into Z register 734 from X register 726.

If PX is not zero in block 1134, then in block 1138 the value in X register 726 is shifted left one bit by shifter 728 and PX is decremented. In block 1130, value N is subtracted from the shifted value in X register 726 (i.e., the two's complement of N is added to the shifted value, which is indicated as Z=X+Y). In block 1132, if the subtraction result is not negative (i.e., NFLAG is not equal to one), then in block 1136 the subtraction result in Z register 734 is loaded into X register 726 using feedback path 735 to X mux 708.

In block 1140, if MFLAG from X register 726 is equal to one, then in block 1130 another modulo reduction is done.

If MFLAG does not equal one and PX does not equal zero in block 1142, then in block 1146 the contents in X register 726 are left-shifted by one bit and PX is decremented until MFLAG is equal to one, after which modulo reduction is continued again in block 1130.

In block 1142, if PX=0, then modulo reduction is stopped. In block 1148, the final result in X register 726 is loaded into Z register 734.

After the final result has been loaded into Z register 734, the final result is aligned using counters PX and PS. In general, according to the present invention, alignment is performed using two fixed units of shifting. The first unit of shifting is one bit increments, and the second unit is fixed-size multiple-bit increments, for example, of 32 bits. Counter PS is first used to do a bit-by-bit right shift for a total of up to, for example, 32 one-bit shifts. Then, the value (64−NSIZE), where NSIZE is in bytes, is used as a final counter value to do multiple-bit right shifts with a zero fill of the final result. These multiple-bit right shifts are done to re-align the final result as an adjustment from the most significant word loading approach previously used to load values A and N as described above. By using two distinct fixed sizes of right shifts according to the present invention, the number of clock cycles required to align the final result is significantly reduced.

Specifically, in blocks 1150 and 1152, the final result is shifted right one bit at time with a zero fill using shifter 738 and PS decremented until PS equals zero. In block 1154, PX is initialized to zero and used as a counter for aligning the final result in Z register 734. Specifically, in blocks 1156 and 1158, the final result is shifted right in 32-bit size shifts with a zero fill using shifter 736 and PX incremented until PX is equal to the value of (64−NSIZE), which is indicated in FIG. 11B in block 1156. Calculating the value of (64−NSIZE) is based on the size of X register 726, which is for example 1,024 bits or 128 bytes in size, and NSIZE will be substracted from a different constant value other than 64 for different register sizes. Then, right-shifting is done in 32-bit words to offset the most significant word loading of values A and N as described above.

Once the final result is aligned, in block 1160 signal DONE is set to one. The final result is loaded into B register 704 from Z register 734. Then, the final result in B register 704 and the size of the final result, for example, in bytes is provided to exponentiator 602, and the procedure ends in block 1162. The final result will be of size NSIZE.

The procedure used to calculate A mod N as described above is generally applicable to other modulo reduction calculations performed by post processor 600. For example, as mentioned above, post processor 600 may be used to calculate the value of $r^{2(n+8)}$ mod N. The value of r is selected as an integer multiple of base two (e.g., $2^{16}$) so that the value of $r^{2(n+8)}$ can be represented in binary form by a single one most significant bit followed by many zeros, which corresponds to the value provided by input 712. Once the value of input 712 is loaded into X register 726, modulo reduction using modulus N is done, as described above for the case of A mod N, to provide the result $r^{2(n+8)}$ mod N, which is provided to exponentiator 602.

According to the present invention, the Montgomery constant is calculated on demand as needed by exponentiator 504 or 506. Modulo processor 508 or 510 receives the modulus N and the size of N from exponentiator 504 or 506 prior to a modulo exponentiation computation to be done by exponentiator 504 or 506. Modulo processor 508 or 510 calculates the result $r^{2(n+8)}$ mod N and provides it to exponentiator 504 or 506 for use in converting an operand into Montgomery form in preparation for modulo multiplication or exponentiation in exponentiator 504 or 506. Modulo processor 508 or 510 sets the value of ASIZE to properly correspond to the size of input 712 loaded into X mux 708. ASIZE is selected, for example, by using a lookup table in the modulo processor hardware.

The procedure described above also may be generally used to perform the calculation (A+B) mod N by first adding values A and B using full adder 614 to obtain a final result in Z register 734. This result is loaded into B register 704 using feedback path 739. Modulus N is placed into two's complement form as discussed above, and the addition result (A+B) in B register 704 is loaded into X register 726 to do modulo reduction as described above for A mod N where A in this case is the (A+B) addition result.

The following is an example of a modulo reduction calculation of the form A mod N according to the alternative embodiment of the invention presented above. Post processor 508 generally can be used for performing A mod N, (A+B) mod N, and B mod N operations having operand and modulus sizes ranging, for example, from 4-bytes to 256-bytes in 4-byte increments. The example below specifically illustrates the modulo reduction of 147 mod 13, which has a final result of 4 (in decimal), or 0x93 mod 0xD, which has a final result of 0x4 (in hexadecimal).

In this example, ASIZE and NSIZE are set equal to 4 bytes. The A register is loaded with the hexadecimal value 0x93, and the N register is loaded with the hexadecimal value 0xD. The X, Y, and Z registers are, for example, 1026-bits wide (i.e., having bit positions [1025, 1024, 1023, . . . 0]). However, in this example the values shown are only 4 bytes wide for simplification of illustration, and only the top 34-bit portion (or 34 most significant bit positions [1025:992]) of the X, Y, and Z registers is illustrated. NFLAG corresponds to Z register bit position [1025]. VFLAG and MFLAG correspond to X register bit position [1024] and X register bit position [1023], respectively. For simplicity of illustration, X, Y, and Z registers 726, 730 and 734 are referred to below by the notation "Xreg", "Yreg", and "Zreg", and A and N registers 700 and 702 by the notation "A" and "N".

The detailed steps in performing modulo reduction according to this specific example are now set forth below:

1. Clear the contents of Xreg and Yreg. For illustrative purposes, only the bits [1025:992 ] of Xreg, Yreg, and Zreg are shown (in hexadecimal form).

Xreg[1025:992]=0_0000_0000

Yreg[1025:992]=0_0000_0000

2. The contents of N are loaded into Xreg 4-bytes at a time starting from the most significant 32-bit double word (referred to below as "dword") of N into the most significant dword of Xreg.

Xreg=0_0000_000D

3. Shift Xreg left by one bit and increment counters PX and PS (referred to below simply as "PX" and "PS") by one until MFLAG=1, filling the least significant bits of Xreg with 0 on each shift. The NFLAG is a "don't care" at this step.

| | | | |
|---|---|---|---|
| Xreg = 0_D000_0000 | NFLAG = x | VFLAG = 0 | MFLAG = 1 |
| Yreg = 0_0000_0000 | PX = 0x1C | PS = 0x1C | |

4. Add Xreg and Yreg together to get the Xreg value into Zreg.

| | | | |
|---|---|---|---|
| Xreg = 0_D000_0000 | NFLAG = 0 | VFLAG = 0 | MFLAG = 1 |
| Yreg = 0_0000_0000 | PX = 0x1C | PS = 0x1C | |
| Zreg = 0_D000_0000 | | | |

5. Load inverted Zreg value into Yreg. Set Xreg to 0x1. Add Xreg and Yreg into Zreg.

| | | | |
|---|---|---|---|
| Xreg = 0_0000_0001 | NFLAG = 1 | VFLAG = 0 | MFLAG = 0 |
| Yreg = 3_2FFF_FFFF | PX = 0x1C | PS = 0x1C | |
| Zreg = 3_3000_0000 | | | |

6. Load Zreg into Yreg. Load contents of A into Xreg 4-bytes at a time starting from the most significant dword of A into the most significant dword of Xreg.

| | | | |
|---|---|---|---|
| Xreg = 0_0000_0093 | NFLAG = 1 | VFLAG = 0 | MFLAG = 0 |
| Yreg = 3_3000_0000 | PX = 0x1C | PS = 0x1C | |
| Zreg = 3_3000_0000 | | | |

7. Shift Xreg left by 1 bit and decrement PX by 1 bit until MFLAG=1.

| | | | |
|---|---|---|---|
| Xreg = 0_9300_0000 | NFLAG = 1 | VFLAG = 0 | MFLAG = 1 |
| Yreg = 3_3000_0000 | PX = 4 | PS = 0x1C | |
| Zreg = 3_3000_0000 | | | |

8. Add Xreg and Yreg into Zreg.

| | | | |
|---|---|---|---|
| Xreg = 0_9300_0000 | NFLAG = 1 | VFLAG = 0 | MFLAG = 1 |
| Yreg = 3_3000_0000 | PX = 4 | PS = 0x1C | |
| Zreg = 3_C300_0000 | | | |

9. Since NFLAG=1 and PX is not equal to 0, shift Xreg left and decrement PX by 1 bit.

| | | | |
|---|---|---|---|
| Xreg = 1_2600_0000 | NFLAG = 1 | VFLAG = 1 | MFLAG = 0 |
| Yreg = 3_3000_0000 | PX = 3 | PS = 0x1C | |
| Zreg = 3_C300_0000 | | | |

10. Add Xreg and Yreg into Zreg.

| | | | |
|---|---|---|---|
| Xreg = 1_2600_0000 | NFLAG = 0 | VFLAG = 1 | MFLAG = 0 |
| Yreg = 3_3000_0000 | PX = 3 | PS = 0x1C | |
| Zreg = 0_5600_0000 | | | |

11. Since NFLAG=0, load Zreg into Xreg.

| | | | |
|---|---|---|---|
| Xreg = 0_5600_0000 | NFLAG = 0 | VFLAG = 0 | MFLAG = 0 |
| Yreg = 3_3000_0000 | PX = 3 | PS = 0x1C | |
| Zreg = 0_5600_0000 | | | |

12. Since MFLAG=0, shift Xreg left and decrement PX by 1 until MFLAG=1 or PX=0.

```
Xreg = 0__AC00__0000    NFLAG = 0    VFLAG = 0    MFLAG = 1
Yreg = 3__3000__0000    PX = 2       PS = 0x1C
Zreg = 0__5600__0000
```

13. Add Xreg and Yreg into Zreg.

```
Xreg = 0__AC00__0000    NFLAG = 1    VFLAG = 0    MFLAG = 1
Yreg = 3__3000__0000    PX = 2       PS = 0x1C
Zreg = 3__DC00__0000
```

14. Since NFLAG=1 and PX is not equal to 0, shift left and decrement PX by 1.

```
Xreg = 1__5800__0000    NFLAG = 1    VFLAG = 1    MFLAG = 0
Yreg = 3__3000__0000    PX = 1       PS = 0x1C
Zreg = 3__DC00__0000
```

15. Add Xreg and Yreg into Zreg.

```
Xreg = 1__5800__0000    NFLAG = 0    VFLAG = 1    MFLAG = 0
Yreg = 3__3000__0000    PX = 1       PS = 0x1C
Zreg = 0__8800__0000
```

16. Since NFLAG=0, load Zreg into Xreg.

```
Xreg = 0__8800__0000    NFLAG = 0    VFLAG = 0    MFLAG = 1
Yreg = 3__3000__0000    PX = 1       PS = 0x1C
Zreg = 0__8800__0000
```

17. Since MFLAG=1, it is not necessary to shift Xreg and decrement PX.

```
Xreg = 0__8800__0000    NFLAG = 0    VFLAG = 0    MFLAG = 1
Yreg = 3__3000__0000    PX = 1       PS = 0x1C
Zreg = 0__8800__0000
```

18. Add Xreg and Yreg into Zreg.

```
Xreg = 0__8800__0000    NFLAG = 1    VFLAG = 0    MFLAG = 1
Yreg = 3__3000__0000    PX = 1       PS = 0x1C
Zreg = 3__B800__0000
```

19. Since NFLAG=1 and PX is not equal to 0, shift Xreg left and decrement PX by 1.

```
Xreg = 1__1000__0000    NFLAG = 1    VFLAG = 1    MFLAG = 0
Yreg = 3__3000__0000    PX = 0       PS = 0x1C
Zreg = 3__B800__0000
```

20. Add Xreg and Yreg into Zreg.

```
Xreg = 1__1000__0000    NFLAG = 0    VFLAG = 1    MFLAG = 0
Yreg = 3__3000__0000    PX = 0       PS = 0x1C
Zreg = 0__4000__0000
```

21. Since NFLAG=0, load Zreg into Xreg.

```
Xreg = 0__4000__0000    NFLAG = 0    VFLAG = 0    MFLAG = 0
Yreg = 3__3000__0000    PX = 0       PS = 0x1C
Zreg = 0__4000__0000
```

22. MFLAG=0 and PX=0, so adding is complete. Set Yreg to 0.

```
Xreg = 0__4000__0000    NFLAG = 0    VFLAG = 0    MFLAG = 0
Yreg = 0__0000__0000    PX = 0       PS = 0x1C
Zreg = 0__4000__0000
```

23. Add Xreg and Yreg into Zreg.

```
Xreg = 0__4000__0000    NFLAG = 0    VFLAG = 0    MFLAG = 1
Yreg = 0__0000__0000    PX = 0       PS = 0x1c
Zreg = 0__4000__0000
```

24. Shift Zreg right by the number in PS.

```
Zreg=0__0000__0004
```

25. Shift contents of Zreg down to the right in groups of 32-bits at a time for a total of 64-NSIZE 32-bit shifts (i.e., a total of 60 shifts in this example). Set signal DONE to indicate processing is completed.

By the foregoing description, a novel method and system for a full-adder post processor for modulo arithmetic have been described. The present invention has the advantages of performing high-speed modulo reduction and addition in a modular exponentiation and multiplication system. The present invention can be used as a high-performance security coprocessor for use with host or network processors. Other particular advantages include the use of the present invention for handling high-speed modulo computations involving large numbers.

Although specific embodiments have been described above, it will be appreciated that numerous modifications and substitutions of the invention may be made. Accordingly, the invention has been described by way of illustration rather than limitation.

What is claimed is:

1. A system of cryptography processor comprising:
an exponentiator operable to perform modulo exponentiation comprising reducing the size of an intermediate result at least once during modulo exponentiation computations;
a modulo processor, operable to perform modulo reduction, comprising an adder, wherein the modulo processor is coupled to receive operands from the exponentiator corresponding to the modulo exponentiation, is operable to add the operands using the adder to provide a sum, and is operable to return the sum to the exponentiator, wherein the modulo processor is operable to perform modulo reduction independent of the exponentiator to speed up cryptography processor;
wherein said adder is a full adder; and
the operands from the exponentiator comprise carry data and sum data corresponding to a partial product; and
wherein said modulo processor is operable to calculate a Montgomery constant in hardware and provide the Montgomery constant to the exponentiator for converting an operand into Montgomery form in preparation for the modulo exponentiation.

2. The cipher processing system of claim 1 wherein the exponentiator performs the modulo exponentiation using a modulus having a bit size and by reducing the size of the intermediate result to a size no larger than the bit size of the modulus.

3. The cipher processing system of claim 2 wherein reducing the size of the intermediate result comprises reducing the intermediate result to the bit size of the modulus by shifting the intermediate result by one bit position.

4. The cipher processing system of claim 1 wherein the intermediate result corresponds to the partial product.

5. The cipher processing system of claim 1 wherein:
the modulo exponentiation comprises a plurality of modulo multiplications; and
the modulo processor receives and adds the operands from the exponentiator for returning the sum after each of the plurality of modulo multiplications.

6. The cipher processing system of claim 1 wherein the exponentiator iteratively computes a running partial product during modulo exponentiation computations.

7. The cipher processing system of claim 6 wherein the modulo processor computes a final result for the modulo exponentiation using the adder.

8. A system of cryptography processor comprising:
(a) an exponentiator operable to perform modulo exponentiation; and
(b) a modulo processor operable to:
(i) perform modulo reduction independent of the exponentiator;
(ii) calculate a Montgomery constant and provide the Montgomery constant to the exponentiator for converting an operand into Montgomery form in preparation for the modulo exponentiation to speed up cryptography processor; and
wherein said modulo processor comprises a full adder and computes the Montgomery constant using the full adder.

9. The cipher processing system of claim 8 wherein the modulo processor is operable to receive a modulus and a bit size of the modulus corresponding to the modulo exponentiation and wherein the modulo processor determines the Montgomery constant using the bit size of the modulus.

10. The cipher processing system of claim 9 wherein the Montgomery constant is selected from a look-up table in hardware.

11. The cipher processing system of claim 9 wherein the Montgomery constant corresponds to the value $r^{2(n+8)}$ mod N, where r is a number, N is the modulus, and n is the bit size of the modulus.

12. The cipher processing system of claim 11 wherein r is an integer multiple of base two.

13. A system of cryptography processor comprising:
an exponentiator operable to perform modulo exponentiation; and
a modulo processor, operable to perform modulo reduction independently of the exponentiator, comprising an adder, wherein the modulo processor is coupled to receive operands from the exponentiator corresponding to the modulo exponentiation, adds the operands using the adder to provide a sum, and returns the sum to the exponentiator to speed up cryptography processor; and
wherein the modulo processor further comprises a modulo processor register having an output coupled to an input of the adder, the modulo processor register stores intermediate results during the modulo reduction, and the modulo processor register has a size of at least 128 bits; and
wherein said adder is a full adder.

14. The cipher processing system of claim 13 wherein the modulo processor register has a size of at least 1,024 bits.

15. The cipher processing system of claim 13 wherein:
the exponentiator comprises an exponentiator register for storing intermediate results during modulo exponentation; and
the exponentiator register has a size of at least 128 bits.

16. The cipher processing system of claim 15 wherein the modulo processor register and the exponentiator register handle operands of substantially the same size.

17. A method of operating cryptography processor performing a modulo reduction of a value using a modulus to determine a modulo result, the method comprising:
testing for the presence of an overflow condition associated with the value;
if the overflow condition is present performing an initial modulo reduction of the value using the modulus and performing one or more subsequent modulo reduction operations of the value as necessary to determine the modulo result;
if the overflow condition is not present, determining a state of a most significant bit of the value and aligning the value in response to the state of the most significant bit of the value and performing modulo reduction operations of the value as necessary to determine the modulo result, and using the determined modulo result to speed up cryptography processor; and
wherein performing the successive modulo reduction operations provides a plurality of intermediate results, wherein intermediate results comprising shifting in response to the state of the most significant bit and further determining a state of a most significant bit of the modulus and aligning the modulus in response to the state of the most significant bit of the modulus.

18. The method of claim 17 wherein performing the successive modulo reduction operations provides a plurality of intermediate results and further comprising determining a state of a most significant bit of at least one of the plurality of intermediate results.

19. The method of claim 18 wherein at least one of the plurality of intermediate results is shifted in response to the state of the most significant bit.

20. A cryptography processor performing modulo reduction of a first operand using a modulus to determine a modulo result, comprising:
an adder;
a first register coupled to a first input of the adder;
a second register coupled to a second input of the adder;
a third register coupled to an output of the adder; a first multiplexer having an output coupled to the first register;
a second multiplexer having an output coupled to the second register; and wherein:

(i) the first multiplexer is operable to select a first sum or carry value as an input;
(ii) the second multiplexer is operable to select a second sum or carry value as an input; and
(iii) the first sum or carry value and the second sum or carry value correspond to a partial product resulting from modulo exponentiation computations;

wherein said modulo exponentiation calculation compromises reducing the size of an intermediate result at least once during the modulo exponentiation computations;

wherein said first multiplexer is operable to select a Montgomery constant, for transforming a number into Montgomery form in preparation for Montgomery calculations in the modulo exponentiation computations, as an input; and a modulo processor operable to perform modulo reduction independently of said modulo exponentiation computations to speed up cryptography processor.

21. The processor of claim 20 wherein the adder is a full adder.

22. The processor of claim 21 wherein the first register has a size of at least 128 bits.

* * * * *